Jan. 20, 1959
D. E. BREITHAUPT
2,869,277
ATTACHMENT FOR A FISHING ROD REEL
Filed May 17, 1957
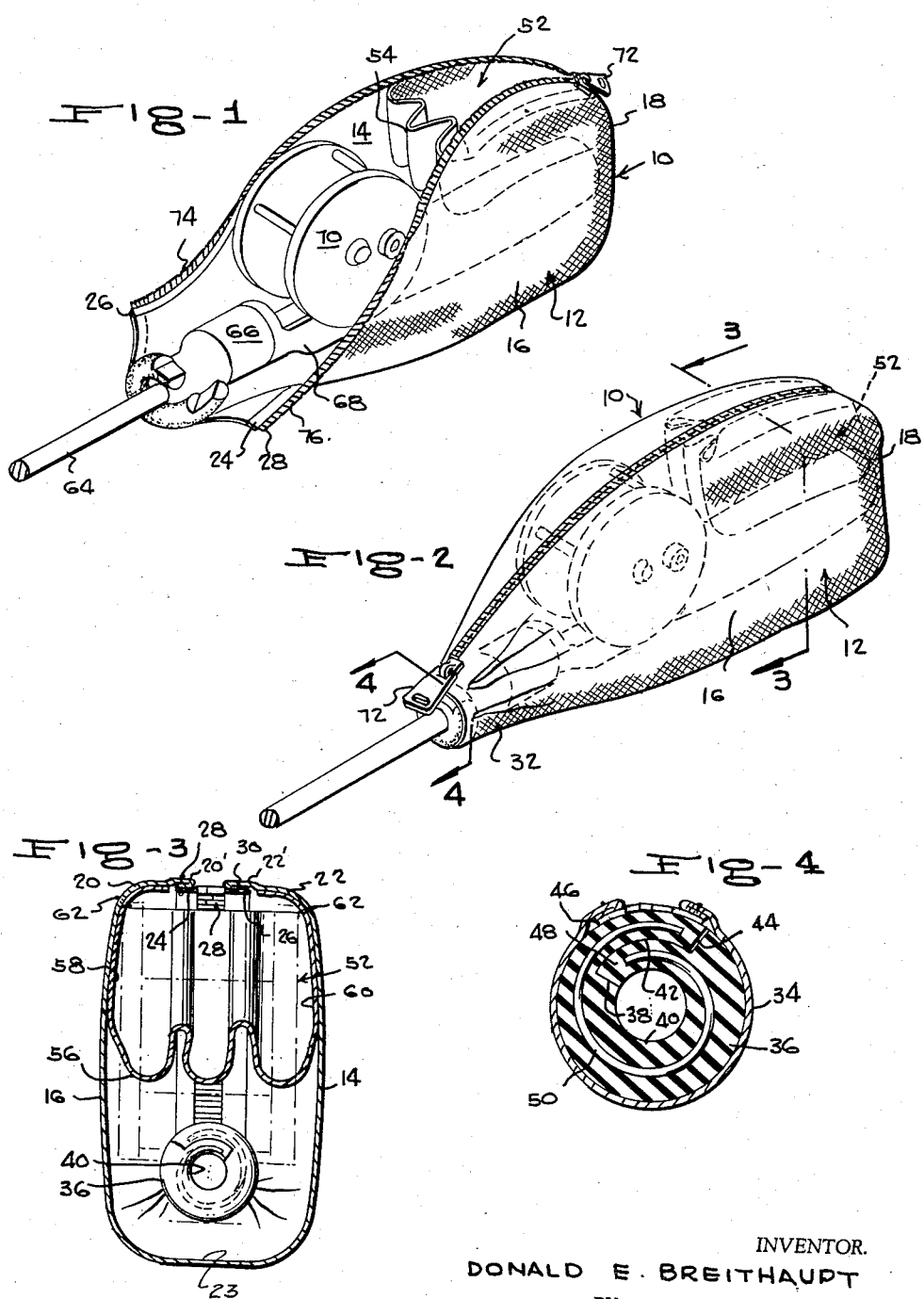
INVENTOR.
DONALD E. BREITHAUPT
BY
McMorrow, Berman & Davidson
ATTORNEYS

2,869,277
ATTACHMENT FOR A FISHING ROD REEL

Donald E. Breithaupt, Shiprock, N. Mex.

Application May 17, 1957, Serial No. 659,803

2 Claims. (Cl. 43—26)

This invention relates to an attachment for a fishing rod and more specifically, the present invention pertains to the provision of means for covering a fishing rod reel without demounting the same from its associated handle.

One of the primary objects of this invention is to provide a protective cover for a fishing rod reel mounted on the handle portion of a fishing rod, the cover serving to prevent dust, dirt, sand and other foreign matter from entering the reel and damaging the component parts thereof.

Another object of this invention is to provide a protective covering device of the type described with a receptacle in which fish hooks, sinkers, and other small articles of fishing paraphernalia may be placed.

A still further object of this invention is to provide a protective cover for a fishing rod reel, together with automatic adjusting means whereby the cover may be used with fishing rods or poles the diameters of which may vary considerably.

This invention also contemplates, as a still further object, the provision of a protective cover for a fishing rod reel which is noncomplex in construction and assembly, inexpensive to manufacture, and durable in use.

Other and further objects and advantages of this invention will become more manifest from a consideration of the following specification when read in conjunction with the annexed drawing, in which:

Figure 1 is a perspective view of a protective covering device for a fishing rod reel, the cover being shown in its open position and being constructed in accordance with the teachings of this invention;

Figure 2 is a perspective view of the protective cover illustrated in Figure 1, the illustration of Figure 2 showing the cover in its closed position;

Figure 3 is a detailed cross sectional view taken on the vertical plane of line 3—3 of Figure 2, looking in the direction of the arrows; and Figure 4 is an enlarged detailed cross sectional view taken on the vertical plane of line 4—4 of Figure 2 looking in the direction of the arrows.

Referring now more specifically to the drawing, reference numeral 10 designates, in general, a protective cover for a fishing rod reel constructed in accordance with the present invention. The protective cover 10 may be formed of canvas, plastic, or of any other suitable material and is seen to comprise a substantially rectangular main body portion 12 including the oppositely disposed side wall portions 14, 16, a back wall portion 18, a pair of laterally spaced and confronting top panel portions 20, 22 and a bottom wall portion 23. The adjacent marginal edges of the panels 20, 22 are reverted at 20', 22' and overlie a pair of longitudinally extending side strips 24, 26, respectively, of a conventional zipper device designated by reference numeral 28. The reverted edges 20', 22' and the strips 24, 26 are secured together, respectively, by lines of stitches 28, 30.

The side walls 14, 16, the panels 20, 22, and to some extent the bottom wall 23, converge towards the forward end of the cover 10 to form a forwardly projecting neck portion 32 which terminates in a substantially cylindrical end 34 (see Figure 4). The end 34 is fixedly secured by conventional means (adhesive, for example) to the outer side of a split washer 36 formed of rubber or of any other elastic and resilient material.

As is seen in Figure 4, the washer 36 is provided with a radial slit 38 which extends outwardly from the central opening 40, the slit 38 communicating with an arcuate slit 42 which, in turn, communicates with a second radial slit 44. The arrangement of the slits is such as to provide a split washer having overlapped arcuate washer sections 46 and 48. The split washer 36 is completed by embedding therein a spiral spring 50, the ends of the latter terminating within the arcuate washer sections 46, 48, the spring normally biasing the sections for movement towards each other.

The reel cover or protecting device 10 is completed by constructing a fishing rod accessory pocket 52 adjacent the back wall 18. The pocket 52 is of the accordion type and includes a forward convoluted end wall 54, and a convoluted bottom wall 56 from which arise a pair of laterally spaced side walls 58, 60, the latter being secured to the side walls 14, 16 by lines of stitches 62.

The protective cover 10 is designed to engage around a fishing rod handle with the reel mounted in place thereon. To this end, and referring to Figure 1 of the drawing, reference numeral 64 designates a fishing pole rod section connected through a ferrule 66 with a handle 68 on which, through conventional means (not shown) is supported a reel 70. To encase the handle 68 and the reel 70 within the protective cover 10 it is necessary to move the slide fastener 72 from its forward position shown in Figure 2 to its rear position as is illustrated in Figure 1 to separate the fastening elements 74, 76 and thereby opening the protective cover 10. The side walls 14, 16 are now spread apart (see Figure 1) and the handle 68 and reel 70 are disposed within the cover 10. The split washer sections 46, 48 are now forced open to permit the rod section 64 to enter the opening 40. The sections are then released and the washer 36 closes against the rod section 64. The slide fastener 72 is now moved from the position shown in Figure 1 to that shown in Figure 2 in order to cause the elements 74, 76 to interlock in the conventional manner. The handle 68 and the reel 70 are now completely enclosed within the protective cover 10.

To remove the handle 68 and connected reel 70 from the cover 10 it is only necessary to execute the above procedure in reverse.

It should be here noted that in the event it is desired to remove tackle or other accessories from the pocket 52 it is not necessary to remove the cover from the reel 70 and handle 68. The operator merely moves the fastener 72 to its open position as is illustrated in Figure 1 in order to obtain access to the pockets 52.

Thus, from the above description of this invention, it should now be clear that the washer 36 provides a dust tight connection which will accommodate fishing rod sections having diameters of varying dimensions. In the event the diameter of any given section is greater than that normally used, the insertion thereof within the opening 40 will cause the overlapped collar sections 46, 48 to separate from each other. However, dust, moisture, or other foreign matter cannot enter or pass the collar 46 until the free ends of the sections 46, 48 have become aligned one with the other.

Having described and illustrated one embodiment of this invention in detail, it will be understood that the same is offered merely by way of example, and that the invention is to be limited only by the scope of the appended claims.

What is claimed is:

1. A protective cover for a fishing rod reel mounted on a fishing rod handle, said cover being formed of flexible material, said cover having a substantially rectangular cross-sectional configuration and including a pair of oppositely disposed open and closed ends, a bottom wall portion, a pair of laterally spaced side wall portions, and a pair of longitudinally extending laterally spaced panel portions extending, respectively, from said side wall portions to form an opening in one side of said cover, said side wall portions being disposed in vertically spaced relation relative to said bottom wall portion, said panel portions having confronting adjacent edges, closure means for releasably connecting said confronting edges of said panels together, a resilient split washer for engagement around said rod adjacent said handle, means connecting said washer within said open end of said cover to close the same, the upper ends of said side walls converging downwardly towards said open end of said cover, and said cover having pocket means disposed therein adjacent said closed end thereof.

2. A protective cover for a fishing rod reel mounted on a fishing rod handle as defined in claim 1, wherein said pocket comprises a transversely extending convoluted front wall, a convoluted bottom wall extending rearwardly to said closed end of said cover, a pair of laterally spaced side walls, and means securing said side walls of said pocket to said side walls of said cover.

References Cited in the file of this patent

UNITED STATES PATENTS

| | | |
|---|---|---|
| 2,194,639 | Cole | Mar. 26, 1940 |
| 2,601,839 | Kucewicz | July 1, 1952 |
| 2,618,880 | Sourek | Nov. 25, 1952 |
| 2,723,482 | Martin | Nov. 15, 1955 |